US005393438A

United States Patent [19]

Fernandez

[11] Patent Number: 5,393,438

[45] Date of Patent: Feb. 28, 1995

[54] FIRE EXTINGUISHING COMPOSITION AND PROCESS

[75] Inventor: Richard E. Fernandez, Bear, Del.

[73] Assignee: E. I. Du Pont de Nemours and Company, Wilmington, Del.

[21] Appl. No.: 899,282

[22] Filed: Jun. 16, 1992

Related U.S. Application Data

[63] Continuation-in-part of Ser. No. 436,465, Nov. 14, 1989, Pat. No. 5,141,654.

[51] Int. Cl.[6] ......................... A62C 3/00; C09K 21/00

[52] U.S. Cl. ........................................... 252/8; 252/2; 252/3; 169/46

[58] Field of Search ..................... 252/8, 2, 3; 169/46, 169/71, 47

[56] References Cited

U.S. PATENT DOCUMENTS

| | | | |
|---|---|---|---|
| 4,954,271 | 9/1990 | Green | 252/8 |
| 5,040,609 | 8/1991 | Dougherty, Jr. et al. | 169/45 |
| 5,102,557 | 4/1992 | Nimitz et al. | 252/8 |
| 5,113,947 | 5/1992 | Robin | 169/46 |
| 5,124,053 | 6/1992 | Ilkubo et al. | 252/8 |

*Primary Examiner*—Robert L. Stoll
*Assistant Examiner*—Joseph D. Anthony

[57] ABSTRACT

A process for extinguishing, preventing and controlling fires using a composition containing at least one fluoro-substituted propane selected from the group of 2,2-dichloro-1,1,1-trifluoroethane ($CHCl_2CF_3$), 2-chloro-1,1,1,2-tetrafluoroethane ($CHClFCF_3$), and 1,1,1,2-tetrafluoroethane ($CH_2FCF_3$), and mixtures thereof is disclosed. The fluoropropanes can be used in open or enclosed areas with little or no effect on the ozone in the stratosphere and with little effect on the global warming process.

12 Claims, No Drawings

FIRE EXTINGUISHING COMPOSITION AND PROCESS

Cross-Reference to Related Application

This application is a continuation-in-part of U.S. application Ser. No. 07/436,465, filed Nov. 14, 1989, now U.S. Pat. No. 5,141,654

Field of Invention

This invention relates to compositions for use in preventing and extinguishing fires based on the combustion of combustible materials. More particularly, it relates to such compositions that are highly effective and "environmentally safe". Specifically, the compositions of this invention have little or no effect on the ozone layer depletion process; and make no or very little contribution to the global warming process known as the "greenhouse effect". Although these compositions have minimal effect in these areas, they are extremely effective in preventing and extinguishing fires, particularly fires in enclosed spaces.

Background of the Invention and Prior Art

In preventing or extinguishing fires, two important elements must be considered for success: (1) separating the combustibles from air; and (2) avoiding or reducing the temperature necessary for combustion to proceed. Thus, one can smother small fires with blankets or with foams to cover the burning surfaces to isolate the combustibles from the oxygen in the air. In the customary process of pouring water on the burning surfaces to put out the fire, the main element is reducing temperature to a point where combustion cannot proceed. Obviously, some smothering or separation of combustibles from air also occurs in the water situation.

The particular process used to extinguish fires depends upon several items, e.g. the location of the fire, the combustibles involved, the size of the fire, etc. In fixed enclosures such as computer rooms, storage vaults, rare book library rooms, petroleum pipeline pumping stations and the like, halogenated hydrocarbon fire extinguishing agents are currently preferred. These halogenated hydrocarbon fire extinguishing agents are not only effective for such fires, but also cause little, if any, damage to the room or its contents. This contrasts to the well-known "water damage" that can sometimes exceed the fire damage when the customary water pouring process is used.

The halogenated hydrocarbon fire extinguishing agents that are currently most popular are the bromine-containing halocarbons, e.g. bromotrifluoromethane ($CF_3Br$, Halon 1301) and bromochlorodifluoromethane ($CF_2ClBr$, Halon 1211). It is believed that these bromine-containing fire extinguishing agents are highly effective in extinguishing fires in progress because, at the elevated temperatures involved in the combustion, these compounds decompose to form products containing bromine atoms which effectively interfere with the self-sustaining free radical combustion process and, thereby, extinguish the fire. These bromine-containing halocarbons may be dispensed from portable equipment or from an automatic room flooding system activated by a fire detector.

In many situations, enclosed spaces are involved. Thus, fires may occur in rooms, vaults, enclosed machines, ovens, containers, storage tanks, bins and like areas.

The use of an effective amount of fire extinguishing agent in an enclosed space involves two situations. In one situation, the fire extinguishing agent is introduced into the enclosed space to extinguish an existing fire; the second situation is to provide an ever-present atmosphere containing the fire "extinguishing" or, more accurately "prevention" agent in such an amount that fire cannot be initiated nor sustained. Thus, in U.S. Pat. No. 3,844,354, Larsen suggests the use of chloropentafluoroethane ($CF_3$–$CF_2Cl$) in a total flooding system (TFS) to extinguish fires in a fixed enclosure, the chloropentafluoroethane being introduced into the fixed enclosure to maintain its concentration at less than 15%. On the other hand, in U.S. Pat. No. 3,715,438, Huggett discloses creating an atmosphere in a fixed enclosure which does not sustain combustion. Huggett provides an atmosphere consisting essentially of air, a perfluorocarbon selected from carbon tetrafluoride, hexafluoroethane, octafluoropropane and mixtures thereof.

It has also been known that bromine-containing halocarbons such as Halon 1211 can be used to provide an atmosphere that will not support combustion. However, the high cost due to bromine content and the toxicity to humans i.e. cardiac sensitization at relatively low levels (e.g. Halon 1211 cannot be used above 1–2%) make the bromine-containing materials unattractive for long term use.

In recent years, even more serious objections to the use of brominated halocarbon fire extinguishants has arisen. The depletion of the stratospheric ozone layer, and particularly the role of chlorofluorocarbons (CFC's) have led to great interest in developing alternative refrigerants, solvents, blowing agents, etc. It is now believed that bromine-containing halocarbons such as Halon 1301 and Halon 1211 are at least as active as chlorofluorocarbons in the ozone layer depletion process.

While perfluorocarbons such as those suggested by Huggett, cited above, are believed not to have as much effect upon the ozone depletion process as chlorofluorocarbons, their extraordinarily high stability makes them suspect in another environmental area, that of "greenhouse effect". This effect is caused by accumulation of gases that provide a shield against heat transfer and results in the undesirable warming of the earth's surface.

There is, therefore, a need for an effective fire extinguishing composition and process which contributes little or nothing to the stratospheric ozone depletion process or to the "greenhouse effect".

It is an object of the present invention to provide such a fire extinguishing composition; and to provide a process for preventing and controlling fire in a fixed enclosure by introducing into said fixed enclosure, an effective amount of the composition.

SUMMARY OF INVENTION

The present invention is based on the finding that an effective amount of a composition comprising at least one partially fluoro-substituted ethane selected from the group of pentafluoroethane ($CF_3$–$CHF_2$), also known as HFC-125, the tetrafluoroethanes (CHF2-$CHF_2$ and $CF_3$-$CH_2F$), also known as HFC-134 and HFC-134a, the chlorotetrafluoroethanes ($CF_3$-CFHCl and $CF_2Cl$ -$CF_2H$), also known as HCFC-124 and HCFC-124a, the dichlorotrifluoroethanes ($CF_3$-$CHCl_2$ and CF2Cl- CHFCl), also known as HCFC-123 and HCFC-123a, and the dichlorodifluoroethanes (CHFCl-CHFCl and $CCl_2F-CH_2F$), also known as HCFC-132 and HCFC-132c will prevent and/or extinguish fire based on the combustion of combustible materials, particularly in an enclosed space, without adversely affecting the atmosphere from the standpoint of ozone depletion or "greenhouse effect". The preferred group comprises $CF_3-CHF_2$, $CF_3-CH_2F$ and $CF_3-CHCl_2$.

The partially fluoro-substituted ethanes above may be used in conjunction with as little as 1% of at least one halogenated hydrocarbon selected from the group of difluoromethane (HFC-32), chlorodifluoromethane (HCFC-22), 2,2-dichloro-1,1,1-trifluoroethane (HCFC-123), 1,2-dichloro-1,1,2-trifluoroethane (HCFC-123a), 2-chloro-1,1,1,2-tetrafluoroethane (HCFC-124), 1-chloro-1,1,2,2-tetrafluoroethane (HCFC-124a), pentafluoroethane (HFC-125), 1,1,2,2tetrafluoroethane (HFC-134), 1,1,1,2-tetrafluoroethane (HFC-134a), 3,3-dichloro-1,1,1,2,2-pentafluoropropane (HCFC-225ca), 1,3-dichloro-1,1,2,2,3-pentafluoropropane (HCFC-225cb), 2,2-dichloro-1,1,1,3,3-pentafluoropropane (HCFC-225aa), 2,3-dichloro-1,1,1,3,3-pentafluoropropane (HCFC-225da), 1,1,1,2,2,3,3-heptafluoropropane (HFC-227ca), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,2,2,3hexafluoropropane (HFC-236cb), 1,1,2,2,3,3-hexafluoropropane (HFC-236ca), 1,2-dichloro-1,2-difluoroethane (HCFC-132) , 1,1-dichloro-1,2-difluoroethane (HCFC-132c) , 3-chloro-1,1,2,2,3-pentafluoropropane (HCFC-235ca ), 3-chloro-1,1,2,2-pentafluoropropane (HCFC-235cb ), 1-chloro-1,1,2,2,3-pentafluoropropane (HCFC-235cc ), 3-chloro-1,1,1,3,3-pentafluoropropane (HCFC-235fa ), 3-chloro-1,1,1,2,2,3-hexafluoropropane (HCFC-226ca ), 1-chloro-1,1,2,2,3,3-hexafluoropropane (HCFC-226cb ), 2-chloro-1,1,1,3,3,3-hexafluoropropane (HCFC-226da ), 3-chloro-1,1,1,2,3,3-hexafluoropropane (HCFC-226ea) , and 2-chloro-1,1,1,2,3,3-hexafluoropropane (HCFC-226ba).

PREFERRED EMBODIMENTS

The partially fluoro-substituted ethanes, when added in adequate amounts to the air in a confined space, eliminates the combustion-sustaining properties of the air and suppresses the combustion of flammable materials, such as paper, cloth, wood, flammable liquids, and plastic items, which may be present in the enclosed compartment.

These fluoroethanes are extremely stable and chemically inert. They do not decompose at temperatures as high as 350° C. to produce corrosive or toxic products and cannot be ignited even in pure oxygen so that they continue to be effective as a flame suppressant at the ignition temperatures of the combustible items present in the compartment.

The particularly preferred fluoroethanes HFC-125, HFC-134, and HFC-134a, as well as HCFC-124 are additionally advantageous because of their low boiling points, i.e. boiling points at normal atmospheric pressure of less than −12° C. Thus, at any low environmental temperature likely to be encountered, these gases will not liquefy and will not, thereby, diminish the fire preventive properties of the modified air. In fact, any material having such a low boiling point would be suitable as a refrigerant.

The fluoroethane HFC-125 is also characterized by an extremely low boiling point and high vapor pressure, i.e. above 164 psig at 21'C. This permits HFC-125 to act as its own propellant in "hand-held" fire extinguishers. Pentafluoroethane (HFC-125) may also be used with other materials such as those disclosed on pages 5 and 6 of this specification to act the propellant and co-extinguishant for these materials of lower vapor pressure. Alternatively, these other materials of lower vapor pressure may be propelled from a portable fire extinguisher by the usual propellants, i.e. nitrogen or carbon dioxide. Their relatively low toxicity and their short atmospheric lifetime (with little effect on the global warming potential) compared to the perfluoroalkanes (with lifetimes of over 500 years) make these fluoroethanes ideal for this fire-extinguisher use.

When used in a portable fire extinguisher, the fire extinguishing agent is first (a) stored in a portable fire extinguisher; then (b) transported in the portable fire extinguisher to a fire to be extinguished; and then (c) manually discharged from the portable fire extinguisher upon the fire to be extinguished.

To eliminate the combustion-sustaining properties of the air in the confined space situation, the gas or gases should be used in an amount which will impart to the modified air a heat capacity per mole of total oxygen present sufficient to suppress or prevent combustion of the flammable, non-self-sustaining materials present in the enclosed environment.

The minimum heat capacity required to suppress combustion varies with the combustibility of the particular flammable materials present in the confined space. It is well known that the combustibility of materials, namely their capability for igniting and maintaining sustained combustion under a given set of environmental conditions, varies according to chemical composition and certain physical properties, such as surface area relative to volume, heat capacity, porosity, and the like. Thus, thin, porous paper such as tissue paper is considerably more combustible than a block of wood.

In general, a heat capacity of about 40 cal./° C. and constant pressure per mole of oxygen is more than adequate to prevent or suppress the combustion of materials of relatively moderate combustibility, such as wood and plastics. More combustible materials, such as paper, cloth, and some volatile flammable liquids, generally require that the fluoroethane be added in an amount sufficient to impart a higher heat capacity. It is also desirable to provide an extra margin of safety by imparting a heat capacity in excess of minimum requirements for the particular flammable materials. A minimum heat capacity of 45 cal./° C. per mole of oxygen is generally adequate for moderately combustible materials and a minimum of about 50 cal./° C. per mole of oxygen for highly flammable materials. More can be added if desired but, in general, an amount imparting a heat capacity higher than about 55 cal./° C. per mole of total oxygen adds substantially to the cost without any substantial further increase in the fire safety factor.

Heat capacity per mole of total oxygen can be determined by the formula:

$$C_p^* = (C_p)_{o2} + \Sigma \frac{P_z}{P_{o2}} (C_p)_z$$

wherein:

$C_p^*$ = total heat capacity per mole of oxygen at constant pressure;

$p_o$ = partial pressure of oxygen;

$P_z$ = pressure of other gas; $(C_p)_z$ = heat capacity of other gas at constant pressure.

The boiling points of the fluoroethanes used in this invention and the mole percents required to impart to air heat capacities (Cp) of 40 and 50 cal./° C. at a temperature of 25° C. and constant pressure while maintaining a 20% and 16% oxygen content are tabulated below:

| | | 20% $O_2$ | | 16% $O_2$ |
|---|---|---|---|---|
| FC | Boiling point, °C. | $C_p$ = 40 vol percent | $C_p$ = 50 vol percent | $C_p$ = 50 vol percent |
| 125 | −48.5 | 6.5 | 19.5 | 6.5 |
| 134 | −19.7 | 8.5 | 25.0 | 8.5 |
| 134a | −26.5 | 7.0 | 20.5 | 7.0 |
| 124 | −12.0 | 6.5 | 19.0 | 6.5 |
| 124a | −10.2 | 6.5 | 19.0 | 6.5 |
| 123 | 27.9 | 6.0 | 17.0 | 6.0 |
| 123a | 30.0 | 6.0 | 17.5 | 6.0 |
| 132 | 59.0 | 7.0 | 20.5 | 7.0 |
| 132c | 48.4 | 6.5 | 19.0 | 6.5 |

Introduction of the appropriate gaseous fluoroethanes is easily accomplished by metering appropriate quantities of the gas or gases into the enclosed air-containing compartment.

The air in the compartment can be treated at any time that it appears desirable. The modified air can be used continuously if a threat of fire is constantly present or if the particular environment is such that the fire hazard must be kept at an absolute minimum; or the modified air can be used as an emergency measure if a threat of fire develops.

The invention will be more clearly understood by referring to the examples which follow. The unexpected effects of the fluoroethane compositions, in suppressing and combatting fire, as well as its compatability with the ozone layer and its relatively low "greenhouse effect", when compared to other fire-combatting gases, particularly the perfluoroalkanes and Halon 1211, are shown in the examples.

EXAMPLE 1 -FIRE EXTINGUISHING CONCENTRATIONS

The fire extinguishing concentration of the fluoroethane compositions compared to several controls, was determined by the ICI Cup Burner method. This method is described in "Measurement of Flame-Extinguishing Concentrations" R. Hirst and K. Booth, Fire Technology, vol. 13(4): 296–315 (1977).

Specifically, an air stream is passed at 40 liters/minute through an outer chimney (8.5 cm. I.D. by 53 cm. tall) from a glass bead distributor at its base. A fuel cup burner (3.1 cm. O.D. and 2.15 cm. I.D.) is positioned within the chimney at 30.5 cm. below the top edge of the chimney. The fire extinguishing agent is added to the air stream prior to its entry into the glass bead distributor while the air flow rate is maintained at 40 liters/minute for all tests. The air and agent flow rates are measured using calibrated rotameters.

Each test is conducted by adjusting the fuel level in the reservoir to bring the liquid fuel level in the cup burner just even with the ground glass lip on the burner cup. With the air flow rate maintained at 40 liters/minute, the fuel in the cup burner is ignited. The fire extinguishing agent is added in measured increments until the flame is extinguished. The fire extinguishing concentration is determined from the following equation:

$$\text{Extinguishing concentration} = \frac{F_1}{F_1 + F_2} \times 100$$

where $F_1$ = Agent flow rate $F_2$ = Air flow rate

Two different fuels are used, heptane and methanol; and the average of several values of agent flow rate at extinguishment is used for the following table.

TABLE 1

Extinguishing Concentrations of Certain Fluoroethane Compositions Compared to Other Agents

| | Fuel | | Flow Rate | | |
|---|---|---|---|---|---|
| Agent | Heptane Extinguishing Conc. | Methanol Extinguishing Conc. | Air | Agent (l/min) | |
| Fe # | (vol. %) | (vol. %) | (l/min) | Hept. | Meth. |
| HCFC-123 | 7.1 | 10.6 | 40.1 | 3.06 | 4.75 |
| HCFC-123a | 7.7 | 10.1 | 40.1 | 3.37 | 5.11 |
| HCFC-124 | 8.0 | 11.9 | 40.1 | 3.49 | 5.45 |
| HFC-125 | 10.1 | 13.0 | 40.1 | 4.51 | 5.99 |
| HFC-134a | 11.5 | 15.7 | 40.1 | 5.22 | 7.48 |
| $CF_4$ | 20.5 | 23.5 | 40.1 | 10.31 | 12.34 |
| $C_2F_6$ | 8.7 | 11.5 | 40.1 | 3.81 | 5.22 |
| H-1301* | 4.2 | 8.6 | 40.1 | 1.77 | 3.77 |
| H-1211** | 6.2 | 8.5 | 40.1 | 2.64 | 3.72 |
| $CHF_2Cl$ | 13.6 | 22.5 | 40.1 | 6.31 | 11.64 |

*$CF_3Br$

**$CF_2ClBr$

EXAMPLE 2 CARDIAC SENSITIVITY

The cardiac sensitivity or toxicity of the fluoroethanes, compared to several controls, was determined using the methods described in "Relative Effects of Haloforms and Epinephrine on Cardiac Automaticity" R. M. Hopkins and J. C. Krantz, Jr., Anesthesia and Analgesia, vol. 47 no. 1 (1968) and "Cardiac Arrhythmias and Aerosol 'Sniffing'" C. F. Reinhardt et al. Arch. Environ. Health vol. 22 (February 1971).

Specifically, the cardiac sensitivity is measured using unanesthesized, healthy dogs using the general protocal set forth in the Reinhardt et al article. First, for a limited period, the dog is subjected to air flow through a semi-closed inhalation system connected to a cylindrical face mask on the dog. Then, epinephrine hydrochloride (adrenaline), diluted with saline solution, is administered intravenously and the electrocardiograph is recorded. Then air containing various concentrations of the agent being tested is administered followed by a second injection of epinephrine. The concentrations of agent necessary to produce a disturbance in the normal conduction of an electrical impulse through the heart as characterized by a serious cardiac arrhythmia, are shown in the following table.

TABLE 2

| Agent | Threshhold Cardiac sensitivity (vol. % in air) |
|---|---|
| HFC-134a | 7.5 |
| H-1301* | 7.5 |
| $CHF_2Cl$ | 5.0 |
| HCFC-124 | 2.5 |
| HCFC-123 | 1.9 |

TABLE 2-continued

| Agent | Threshhold Cardiac sensitivity (vol. % in air) |
|---|---|
| H-1211** | 1 to 2 |

*$CF_3Br$
**$CF_2ClBr$

EXAMPLE 3

The ozone depletion potential (ODP) of the fluoroethanes and various blends thereof, compared to various controls, was calculated using the method described in "The Relative Efficiency of a Number of Halocarbon for Destroying Stratospheric Ozone" D. J. Wuebles, Lawrence Livermore Laboratory report UCID-18924, (January 1981) and "Chlorocarbon Emission Scenarios: Potential Impact on Stratospheric Ozone" D. J. Wuebles, Journal Geophysics Research, 88, 1433–1443 (1983).

Basically, the ODP is the ratio of the calculated ozone depletion in the stratosphere resulting from the emission of a particular agent compared to the ODP resulting from the same rate of emission of FC-11 (CFCl3) which is set at 1.0. Ozone depletion is believed to be due to the migration of compounds containing chlorine or bromine through the troposphere into the stratosphere where these compounds are photolyzed by UV radiation into chlorine or bromine atoms. These atoms will destroy the ozone (O3) molecules in a cyclical reaction where molecular oxygen (O2) and [ClO] or [BrO] radicals are formed, those radicals reacting with oxygen atoms formed by UV radiation of O2 to reform chlorine or bromine atoms and oxygen molecules, and the reformed chlorine or bromine atoms then destroying additional ozone, etc., until the radicals are finally scavenged from the stratosphere. It is estimated that one chlorine atom will destroy 10,000 ozone molecules and one bromine atom will destroy 100,000 ozone molecules.

The ozone depletion potential is also discussed in "Ultraviolet Absorption Cross-Sections of Several Brominated Methanes and Ethanes" L. T. Molina, "M. J. Molina and F. S. Rowland" J. Phys. Chem. 86, 2672–2676 (1982); in Bivens et al. U.S. Pat. No. 4,810,403; and in "Scientific Assessment of Stratospheric Ozone: 1989" U.N. Environment Programme (21 August 1989).

In the following table, the ozone depletion potentials are presented for the fluoroethanes used in this invention and various controls.

TABLE 3

| Agent | Ozone Depletion Potential |
|---|---|
| HCFC-123 | 0.013 |
| HCFC-124 | 0.013 |
| HFC-125 | 0 |
| HFC-134a | 0 |
| HFC-134 | 0 |
| $CF_4$ | 0 |
| $C_2F_6$ | 0 |
| H-1301 | 10 |
| $CHF_2Cl$ | ·0.05 |
| H-1211 | 3 |
| $CFCl_3$ | 1 |
| $CF_3$—$CF_2Cl$ | 0.4 |

EXAMPLE 4

The global warming potentials (GWP) of the fluoroethane and various blends thereof, compared to several controls, was determined using the method described in "Scientific Assessment of Stratospheric Ozone: 1989" sponsored by the U.N. Environment Programme.

The GWP, also known as the "greenhouse effect" is a phenomenon that occurs in the troposphere. It is calculated using a model that incorporates parameters based on the agent's atmospheric lifetime and its infrared cross-section or its infra-red absorption strength per mole as measured with an infra-red spectrophotometer.

$$GWP = \frac{\text{Calculated } IR \text{ forcing due to agent}}{\text{Emission rate (steady state) of agent}}$$

divided by the same ratio of parameters for $CFCl_3$.

In the following table, the GWP's are presented for the fluoroethanes and the controls.

TABLE 4

| Agent | Global Warming Potential |
|---|---|
| HFC-134a | 0.220 |
| HFC-125 | 0.420 |
| HCFC-124 | 0.080 |
| HCFC-123 | 0.015 |
| $CF_4$ | greater than 5 |
| $C_2F_6$ | greater than 8 |
| $CHF_2Cl$ | 0.29 |
| $CFCl_3$ | 1.0 |
| $CF_3CF_2Cl$ | 8.2 |

I claim:

1. A method of using a fire extinguishing agent comprising:
   manually discharging a fire extinguishing agent from a portable fire extinguisher upon a fire to be extinguished, wherein the fire extinguishing agent comprises a halogenated alkane composition selected from the group consisting of 2,2-dichloro-1,1,1-trifluoroethane ($CHCl_2CF_3$), 2-chloro-1,1,1,2-tetrafluoroethane ($CHClFCF_3$), 1,1,1,2-tetrafluoroethane ($CH_2FCF_3$), and mixtures thereof.

2. A method for extinguishing a fire which comprises the steps of:
   (a) introducing to the fire a fire extinguishing concentration of an extinguishant composition selected from the group consisting of 2-chloro-1,1,1,2-tetrafluoroethane and 2-chloro-1,1,2,2-tetrafluoroethane and a second extinguishant selected from the group consisting of heptafluoropropane ($CF_3CHFCF_3$), 1,1,1,3,3,3-hexafluoropropane ($CF_3CH_2CF_3$), 1,1,1,2,3,3-hexafluoropropane ($CF_3CHFCHF_2$), pentafluoroethane ($CF_3CHF_2$) and mixtures thereof; and
   (b) maintaining the concentration of the composition until the fire is extinguished.

3. A method for extinguishing a fire comprising the steps of: introducing to the fire a fire-extinguishing concentration of a composition consisting essentially of pentafluoroethane; and maintaining the concentration of the composition until the fire is extinguished.

4. A method of using a fire extinguishing agent comprising the step of flooding the fire with a fire extinguishing agent which consists of a halogenated alkane composition selected from the group consisting of pentafluoroethane ($CF_3CHF_2$); 1,1,2,2-tetrafluoroethane ($CHF_2CHF_2$); 1,1,2-tetrafluoroethane ($CH_2FCF_3$); 2-chloro-1,1,1,2-tetrafluoroethane ($CHClFCF_3$) and mixtures thereof.

5. A method for extinguishing a fire which comprises the steps of:

(a) introducing to the fire a fire extinguishing concentration of an extinguishant composition consisting of 2-chloro-1,1,1,2-tetrafluoroethane and a second extinguishant selected from the group consisting of heptafluoropropane ($CF_3CHFCF_3$), 1,1,1,3,3,3-hexafluoropropane ($CF_3CH_2CF_3$), 1,1,1,2,3,3-hexafluoropropane ($CF_3CHFCHF_2$), pentafluoroethane ($CF_3CHF_2$) and mixtures thereof; and (b) maintaining the concentration of the composition until the fire is extinguished.

6. The method of claim 5 in which said composition consists of a mixture of 2-chloro-1,1,1,2-tetrafluoroethane and 1,1,1,2-hexafluoropropane.

7. The method of claim 5 in which said composition consists of a mixture of 2-chloro-1,1,1,2-tetrafluoroethane and 1,1,1,2,3,3-hexafluoropropane.

8. The method of claim 5 in which said composition consists of a mixture of 2-chloro-1,1,1,2-tetrafluoroethane and pentafluoroethane.

9. The method of claim 5 in which said composition consists of a mixture of 2-chloro-1,1,1,2-tetrafluoroethane and $CF_3CHFCF_3$.

10. The method of claim 5 in which said introducing comprises combining the extinguishant composition with a propellant selected from the group consisting of nitrogen and $CO_2$ and propelling the extinguishant composition to the fire.

11. The method of claim 5 in which said introducing of step a. comprises introducing the composition through a total flooding system.

12. The method of claim 5 in which said introducing of step a. comprises introducing the composition through a portable extinguishing system.

* * * * *

UNITED STATES PATENT AND TRADEMARK OFFICE
CERTIFICATE OF CORRECTION

PATENT NO. : 5,393,438

DATED : Feb. 28, 1995

INVENTOR(S) : Richard E. Fernandez

It is certified that error appears in the above-identified patent and that said Letters Patent is hereby corrected as shown below:

Item [57]

In the "ABSTRACT" only:

line 3, change "propane" to -- ethane --;

line 7, change "fluoropropanes" to -- fluoroethanes --.

Signed and Sealed this

Twenty-fourth Day of March, 1998

Attest:

BRUCE LEHMAN

*Attesting Officer* — *Commissioner of Patents and Trademarks*